US012273331B2

United States Patent
Anderson et al.

(10) Patent No.: US 12,273,331 B2
(45) Date of Patent: Apr. 8, 2025

(54) CALL RECORDING AUTHENTICATION USING DISTRIBUTED TRANSACTION LEDGERS

(71) Applicant: Zoom Communications, Inc., San Jose, CA (US)

(72) Inventors: Walter F. C. Anderson, Santa Cruz, CA (US); Vi Dinh Chau, Seattle, WA (US)

(73) Assignee: Zoom Communications, Inc., San Jose, CA (US)

( * ) Notice: Subject to any disclaimer, the term of this patent is extended or adjusted under 35 U.S.C. 154(b) by 422 days.

(21) Appl. No.: 17/390,730

(22) Filed: Jul. 30, 2021

(65) Prior Publication Data

US 2023/0032477 A1   Feb. 2, 2023

(51) Int. Cl.
*H04L 9/40* (2022.01)
*G06F 16/23* (2019.01)

(52) U.S. Cl.
CPC .......... *H04L 63/08* (2013.01); *G06F 16/2379* (2019.01)

(58) Field of Classification Search
CPC . H04L 63/08; H04L 63/12; H04L 9/50; G06F 16/2379; G06F 16/275; H04M 2203/301; H04M 2203/559; H04M 2203/60; H04M 3/42221
USPC .......................................................... 726/7
See application file for complete search history.

(56) References Cited

U.S. PATENT DOCUMENTS

| | | |
|---|---|---|
| 6,345,094 B1 | 2/2002 | Khan et al. |
| 6,785,370 B2 | 8/2004 | Glowny et al. |
| 8,121,264 B1 | 2/2012 | Hogg, Jr. et al. |
| 8,718,262 B2 | 5/2014 | Conway et al. |
| 9,197,744 B2 | 11/2015 | Sittin et al. |
| 10,079,024 B1 | 9/2018 | Bhimanaik et al. |
| 10,650,476 B2 | 5/2020 | Bassler et al. |
| 10,657,971 B1 | 5/2020 | Newstadt et al. |
| 10,750,009 B1 | 8/2020 | Cox et al. |
| 10,887,081 B2 | 1/2021 | Oberhofer et al. |

(Continued)

FOREIGN PATENT DOCUMENTS

EP       3582465 A1   12/2019

OTHER PUBLICATIONS

Jonkoping University, International Business School, Blockchain in audit trails—An investigation of how blockchain can help auditors to implement audit trails, Rebecka Levenby and Emma Sahlin, <http://hj.diva-portal.org/smash/get/diva2:1212665/FULLTEXT01.pdf>, May 2018, 54 pages.

(Continued)

*Primary Examiner* — Jacob Lipman
(74) *Attorney, Agent, or Firm* — Young Basile Hanlon & MacFarlane, P.C.

(57) ABSTRACT

A recording of a call is authenticated using a distributed transaction ledger. A call between two or more participants is recorded to generate a call recording. A record of the call recording is stored within a distributed transaction ledger. At a later time, such as in response to an access request for auditing or an authentication request, the call recording is authenticated based on information associated with the record within the distributed transaction ledger. An indication of the authentication is then output, such as for further processing or display.

18 Claims, 7 Drawing Sheets

(56) References Cited

U.S. PATENT DOCUMENTS

| | | |
|---|---|---|
| 11,483,427 B1 | 10/2022 | Anderson et al. |
| 12,026,239 B1 | 7/2024 | Tougas et al. |
| 2007/0217649 A1 | 9/2007 | Lowe et al. |
| 2008/0002854 A1 | 1/2008 | Tehranchi et al. |
| 2014/0247926 A1 | 9/2014 | Gainsboro et al. |
| 2016/0165044 A1 | 6/2016 | Chan |
| 2017/0111506 A1 | 4/2017 | Strong et al. |
| 2018/0034961 A1 | 2/2018 | Engelke et al. |
| 2018/0146370 A1 | 5/2018 | Krishnaswamy et al. |
| 2018/0174590 A1 | 6/2018 | Kurian et al. |
| 2018/0254046 A1 | 9/2018 | Khoury et al. |
| 2018/0255130 A1* | 9/2018 | Kozloski ............... H04L 67/535 |
| 2018/0350356 A1 | 12/2018 | Garcia |
| 2019/0238682 A1 | 8/2019 | Christiano et al. |
| 2019/0253558 A1 | 8/2019 | Haukioja et al. |
| 2019/0341050 A1 | 11/2019 | Diamant et al. |
| 2019/0385623 A1 | 12/2019 | Huber |
| 2020/0007311 A1 | 1/2020 | Oberhofer et al. |
| 2020/0119936 A1* | 4/2020 | Balasaygun ........ H04L 12/1831 |
| 2020/0175554 A1* | 6/2020 | Vukich ................ H04L 9/3239 |
| 2020/0211571 A1 | 7/2020 | Shoa et al. |
| 2020/0250287 A1 | 8/2020 | Singh et al. |
| 2020/0304632 A1* | 9/2020 | Johnson ................ H04M 3/436 |
| 2020/0313901 A1* | 10/2020 | Lin ........................ H04L 9/3231 |
| 2020/0336601 A1* | 10/2020 | Simon ................ H04M 7/0057 |
| 2020/0349949 A1 | 11/2020 | Yoshioka et al. |
| 2020/0411013 A1 | 12/2020 | Horton et al. |
| 2021/0037136 A1 | 2/2021 | Michaeli et al. |
| 2022/0013114 A1 | 1/2022 | Camenares et al. |
| 2022/0014820 A1 | 1/2022 | Hannes et al. |
| 2022/0067870 A1 | 3/2022 | Kronstadt et al. |
| 2022/0148601 A1 | 5/2022 | Kracun et al. |
| 2023/0067155 A1* | 3/2023 | Jackson .................... H04L 9/50 |

OTHER PUBLICATIONS

HAL archives-ouvertes.fr, Blockchain-Based Auditing of Transpared Log Servers, Nguyen et al., <https://hal.archives-ouvertes.fr/hal-01917636/document>, Jul. 2018, 18 pages.

International Search Report and Written Opinion, mailed Jun. 29, 2022 in corresponding PCT Application No. PCT/US2022/024827.

* cited by examiner

CALL RECORDING AUTHENTICATION USING DISTRIBUTED TRANSACTION LEDGERS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
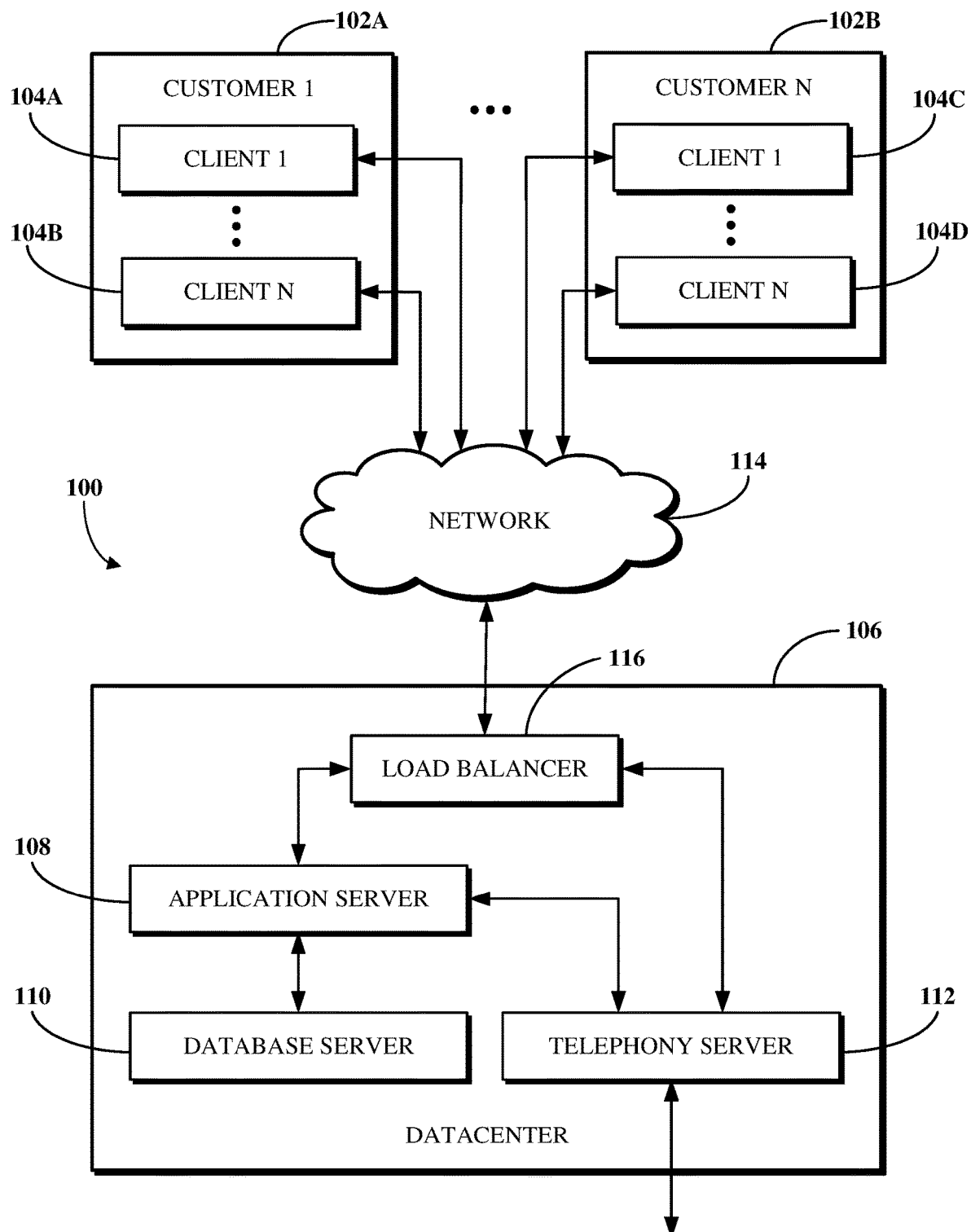
FIG. 1 is a block diagram of an example of an electronic computing and communications system.

Disclosed herein are, inter alia, implementations of systems and techniques for call recording authentication using distributed transaction ledgers.

One aspect of this disclosure is a method, which includes recording a call between two or more participants to generate a call recording, storing a record of the call recording within a distributed transaction ledger, authenticating the call recording based on information associated with the record within the distributed transaction ledger, and outputting an indication of the authentication.

Another aspect of this disclosure is a system, which includes a telephony system configured to enable a call between two or more participants, and an authentication system configured to store a record of the call recording within a distributed transaction ledger and authenticate the call recording based on information associated with the record within the distributed transaction ledger.

Yet another aspect of this disclosure is an apparatus, which includes a memory and a processor configured to execute instructions stored in the memory to store a record of a call recording within a distributed transaction ledger, authenticate the call recording based on information associated with the record within the distributed transaction ledger in response to a request from an operator device, and output an indication of the authentication to the operator device.

Many call participants choose to record calls for later reference, such as for data gathering, quality assurance, or other purposes. In some cases, a call may be recording on behalf of all parties to the call. For example, a call center may by default record some or all incoming or outgoing calls with a notice to callers that their calls may be recorded. In another example, in compliance-required settings where calls are taking place within a regulated industry, for example, the financial industry, some or all incoming or outgoing calls may be recorded for later review, such as to verify whether the call participants complied with relevant rules, regulations, and/or laws.

When reviewing a call recording, and especially in the context of reviewing a call recording to verify that the subject of the call is in compliance with relevant rules, regulations, and/or laws, it is important to know that a call recording is a true representation of the call itself. A call recording can be considered a true representation of a subject call where the contents of the call recording match the contents of the call. For example, if there is a period of silence within a call recording, the call recording may be considered a true representation of the subject call where that period of silence was also present in the call itself. In particular, it is important to verify whether a call recording is a true representation of a subject call to determine whether the call recording has been tampered with or otherwise altered.

One approach to authenticating a call recording includes identifying call artifacts based on network connectivity issues of a participant to the call. In particular, a score may be computed during a call based on network information, such as the quality of packets signaled during the call from a device of that participant. The resulting score can imply the presence of some anomaly representative of a call artifact during the call, and a determination can then be made as to whether the call recording includes the same anomaly. For example, scores determined at times throughout a call can be compared against scores determined at times throughout a call recording to determine whether audio quality events associated with those same packet signaling events appear to be present in the call recording.

However, while this approach may be effective in some cases, it relies upon the active processing of a call during the call and the subsequent processing of a call recording, thus demanding compute resources to match aspects of each. Furthermore, this approach may not capture important transactional information relative to the call or the call recording, such as information related to the parties to the call, a software platform user for whom the recording was generated, and the like. This transactional information may be very useful for authenticating the call recording as a true representation of the call as well as for auditing purposes.

Implementations of this disclosure address problems such as these by authenticating a recording of a call using a distributed transaction ledger. A call between two or more participants is recorded to generate a call recording. A record of the call recording is stored within a distributed transaction ledger. At a later time, such as in response to an access request for auditing or an authentication request, the call recording is authenticated based on information associated with the record within the distributed transaction ledger. An indication of the authentication is then output, such as for further processing or display. An audit trail for the call recording record is exposed within the distributed transaction ledger, and later accesses of or changes to the call recording are represented in new records linked to the call recording record within the distributed transaction ledger.

The implementations of this disclosure are described with respect to calls and call recordings; however, it should be understood that the implementations of this disclosure could also or instead be used for conferences and conference recording authentication. That is, generally, a call is a communication between two or more participants over a telephony service, and a conference is a communication between two or more participants over a conference service. Both a telephony service and a conference service may be used to record contents of calls or conferences, respectively. The call recording authentication operations using distributed transaction ledgers as disclosed herein may thus be performed for both calls and call recordings as well as conferences and conference recordings.

To describe some implementations in greater detail, reference is first made to examples of hardware and software structures used to implement a system for call recording authentication using distributed transaction ledgers. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
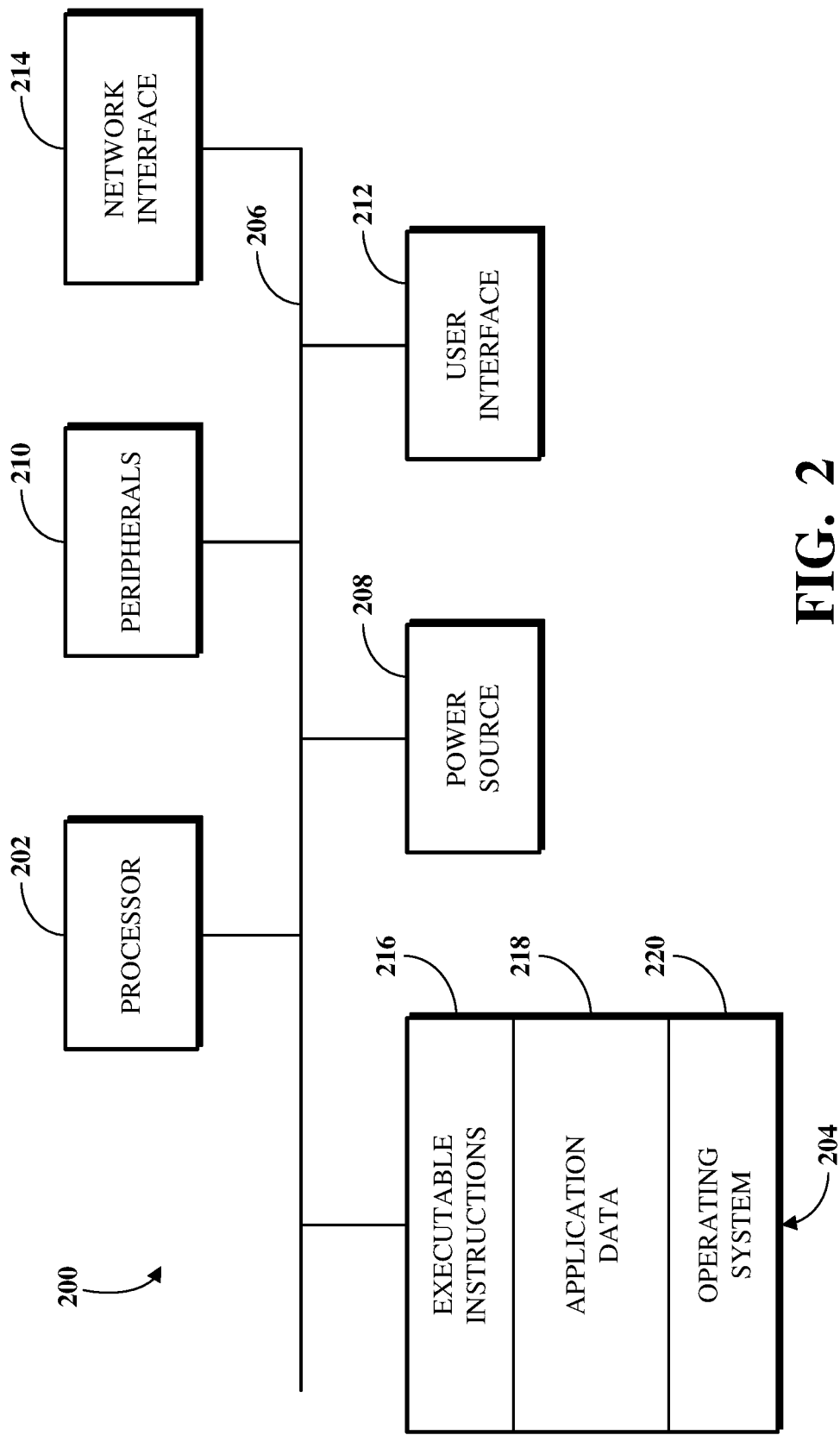
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
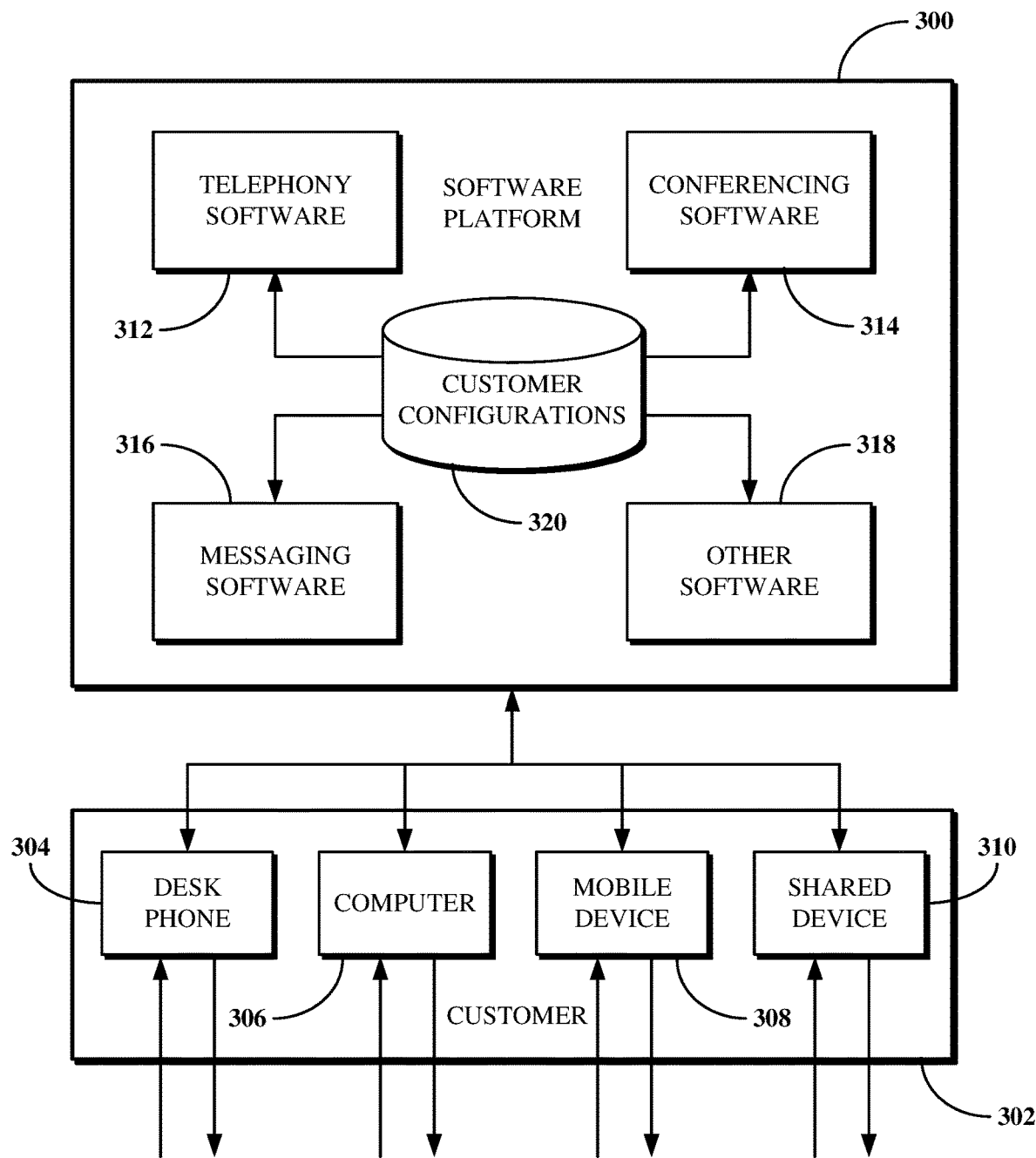
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for authenticating call recordings using distributed transaction ledgers.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
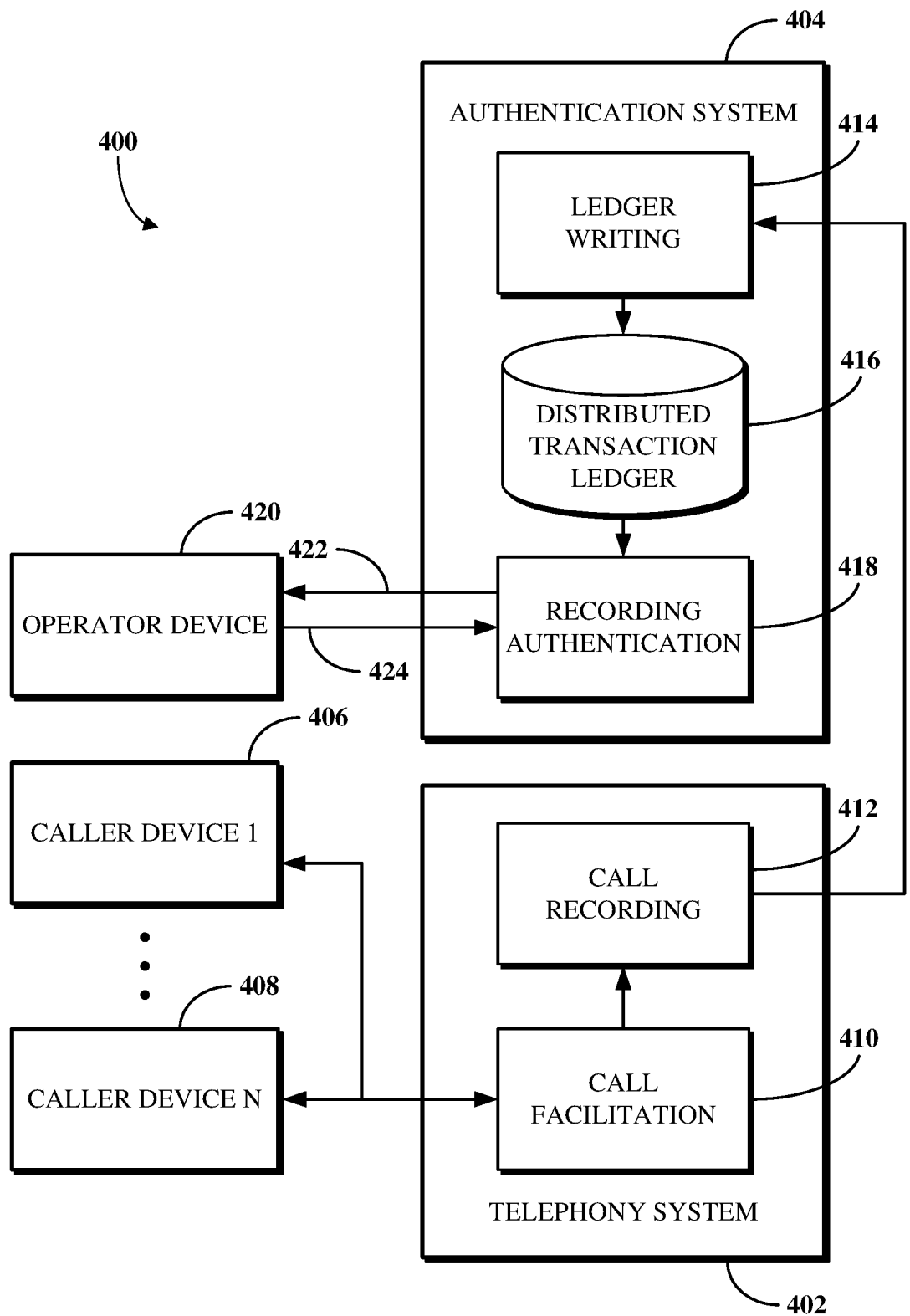
FIG. 4 is a block diagram of an example of a system for call recording authentication using distributed transaction ledgers.

FIG. 4 is a block diagram of an example of a system 400 for call recording authentication using distributed transaction ledgers. The system 400 includes a telephony system 402 and an authentication system 404. The telephony system 402 includes hardware and/or software configured to enable a call between two or more participants including, as shown, an operator of a caller device 1 406 and an operator of a caller device N 408 in which N is an integer greater than 1. The authentication system 404 includes hardware and/or software configured to store records of call recordings generated based on calls facilitated by the telephony system 402 within distributed transaction ledgers and to authenticate those call recordings based on information associated with respective records within those distributed transaction ledgers. Each of the caller devices 1 406 through N 408 is a telephony device (e.g., the desk phone 304, the mobile device 308, or the shared device 310 shown in FIG. 3) which may or may not be a client device.

The telephony system 402 includes call facilitation components 410 and call recording components 412. The call facilitation components 410 enable a call between the operators of the caller devices 1 406 through N 408. The call facilitation components 410 use hardware and/or software for enabling calls, for example, using the telephony server 112 shown in FIG. 1 and/or the telephony software 312 shown in FIG. 3. The call recording components 412 listen to the call enabled by the call facilitation components 410 and generate a call recording of the call. The call recording components 412 use hardware and/or software to process audio data received from the call facilitation components 410 to generate the call recording. In some cases, the call recording is incrementally generated during the call such that the call record as a whole is considered generated upon the processing of the last audio data at the end of the call. In other cases, the call recording is generated after the call ends using audio data which is temporarily stored for processing following the end of the call. Other approaches for the call recording generation are also possible.

The authentication system 404 includes ledger writing components 414, a distributed transaction ledger data store 416, and recording authentication components 418. The ledger writing components 414 receive the call recording generated by the call recording components 412 and information associated with the call recording and write a record associated with the call recording within a distributed transaction ledger stored at the distributed transaction ledger data store 416. In particular, the ledger writing components 414 write data used to reconstruct the call recording and the information associated with the call recording within a new record inserted within the distributed transaction ledger. The information associated with the call recording includes one or more of an identifier of the record, an identifier of the distributed transaction ledger, an identifier of one or more of the two or more participants of the call, content of the call, a duration of the call, or a non-participant custodian of the distributed transaction ledger.

The distributed transaction ledger stores one or more records associated with one or more call recordings. The particular format of the record may vary based on the structure of the distributed transaction ledgers used with the system 400. For example, the format may be a block-based format in which a new record is written to a block within the distributed transaction ledger, a table-based format in which a new record is written to a table row or column within the distributed transaction ledger, or a diagram-based format in which a new record is written to a new entity diagrammatically connected to one or more other entities within the distributed transaction ledger. The ledger writing components 414 write the record of the call recording received from the telephony system 412 within a next data space (e.g., a next block) within the distributed transaction ledger. The distributed transaction ledger to which the ledger writing components 414 write the record is associated with an entity, for example, a customer of a software platform provider.

The distributed transaction ledger data store 416 is a data store, database, or other repository that stores one or more distributed transaction ledgers, including the distributed transaction ledger within which the record of the call recording is written by the ledger writing components 414. The distributed transaction ledger data store 414 may, for example, be implemented using the database server 110 shown in FIG. 1. The distributed transaction ledgers stored within the distributed transaction ledger data store 416 are distributed a network for access by multiple operator devices, including an operator device 420. The operator devices are associated with the entity with which the distributed transaction ledger is associated. The operator devices are authenticated to access some or all of the distributed transaction ledger and may be client devices or non-client devices. As such, copies of the distributed transaction ledger into which the ledger writing components 414 wrote the record associated with the call recording received from the call recording components 412 may exist across a network. Those copies may be updated to include the record associated with the call recording such as responsive to the ledger writing components 414 writing the record associated with the call recording into the distributed transaction record.

The recording authentication components 418 authenticate a call recording associated with a call as a true representation of a subject call based on information stored within a distributed transaction ledger at the distributed transaction ledger data store 416. Authenticating a call recording based on the information stored within a distributed transaction ledger at the distributed transaction ledger data store 416 includes verifying transactional information stored within a record associated with the call recording within the distributed transaction ledger to confirm that the record was written when the call recording was generated. Because each record within the distributed transaction ledger includes a unique transactional identifier based on a writing thereof, such as based on a time of writing, the recording authentication components 418 can determine whether a latest record which includes data usable to reconstruct the call recording matches the transactional identifier generated for the original writing of the call recording data into the distributed transaction ledger. The recording authentication components 418 output an indication 422 of the authentication for further processing or display at the operator device 420.

In particular, the indication of the authentication indicates that the call recording is a true representation of the call where a record which includes data usable to reconstruct the call recording and an identifier written based on the original writing of the call recording to the distributed transaction ledger is a latest such record within the distributed transaction ledger. Similarly, the indication of the authentication indicates that the call recording is not a true representation of the call where a later record including data usable to reconstruct the call recording includes an identifier not based on the original writing of the call recording to the distributed transaction ledger. The form of the indication output for further processing or display may be a visual indicator, an audio indicator, a text indicator, or the like. For example, the indication may be output over one or more modalities including without limitation telephony, conference, messaging, or the like.

The recording authentication components 418 perform the authentication based on a request 424 received from the operator device 420. The recording authentication components 418 output the indication 422 of the authentication to the operator device 420 in response to the request 424. The request 424 may, for example, be a request to audit the record of the call recording within the distributed transaction ledger. In particular, the use of the distributed transaction ledger enables audit tracing of the call recording to authenticate the call recording as a true representation of the subject call at various times during the life of the call recording, as will be further discussed below with respect to FIG. 5. Although the operator device 420 is shown as a device separate from the caller devices 1 406 through N 408 so as to indicate that the operator device 420 was not a device used by a participant of the call, in some implementations, the operator device 420 may be one of the caller devices 1 406 through N 408.

The above flow of operations is described to include writing a record associated with a call recording within a distributed transaction ledger. In such a case, each record within a distributed transaction ledger corresponds to a different call recording, and records associated with call recordings may continue to be written within the distributed transaction ledger until the distributed transaction ledger is full (e.g., as determined based on a maximum number of records defined for the distributed transaction ledger or due to compute resource limitations). However, in some implementations, a record within a distributed transaction ledger may correspond to a portion of a call recording rather than to an entire call recording. For example, the distributed transaction ledger may be generated for the subject call, and records may be written therein to represent different parts of a call recording, such as where the call recording is pushed in pieces to the authentication system 404. In some implementations, a different distributed transaction ledger may be used for each different call recording. In other implementations, records associated with different call recordings may be stored in the same distributed transaction ledger.

In some implementations, the status of all compute nodes which implement copies of the distributed transaction ledger may be checked before a call recording stored within a record of the distributed transaction ledger may be accessed or modified. For example, where one or more such compute nodes are offline or otherwise not discoverable at a given time, the access to or modification of the call recording may result in different information being recorded across the copies of the distributed transaction ledger. Accordingly, in such a case, access to the records of the distributed transaction ledger which correspond to the call recording may be restricted until all compute nodes are determined to be available. The status of the compute nodes may be determined by pinging those compute nodes and determining whether a response is received therefrom or based on information pushed or pulled from those compute nodes.

In some implementations, the telephony system 402 may be replaced with a conferencing system. For example, the conferencing system may include hardware and/or software, such as the conferencing software 314 shown in FIG. 3 and/or the application server 108 shown in FIG. 1, for implementing a conference between the operators of the caller devices 1 406 through N 408. In some such implementations, the operators of the caller devices 1 406 through N 408 are participants of a conference, which may include an audio component, a video component, or both.

For example, where the conference includes an audio component, media of the audio channel capturing that audio component of the conference can be used by the call recording components 412, as conference reporting components, to generate a conference recording of the conference. Information associated with the conference recording may then be determined and stored in a record within the distributed transaction ledger data store 414. The recording authentication components 416 then performs operations against a distributed transaction ledger wholly or partially within the recorded distributed transaction ledger data store 414 to determine whether the conference recording is authenticated and thus to output an indication of the authentication the conference recording.

The system 400 may be implemented as part of a software platform, for example, the software platform 300 shown in FIG. 3, which includes telephony services as well as related services. Alternatively, system 400 may be implemented as part of a telephony platform which includes functionality for supporting or enhancing call technology. In some implementations, the system 400 may exclude the telephony system 402. For example, the authentication system 404 may be implemented by an entity which does not also implement the telephony system 402. In some such implementations, the telephony system 402 and the authentication system 404 may be configured to communicate with one another to perform the functionality of the system 400 as described herein.

Figure 5:
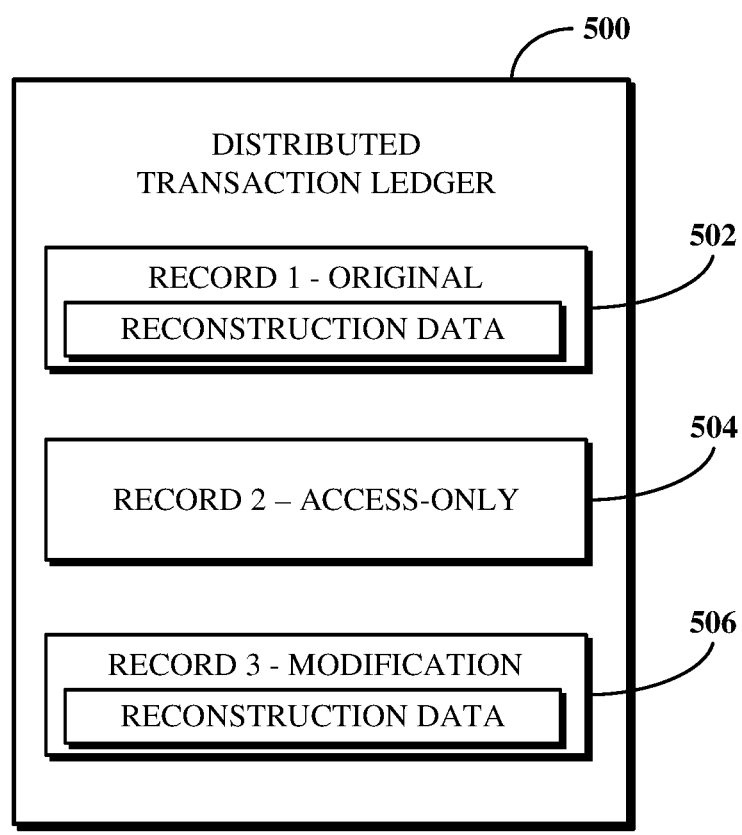
FIG. 5 is a block diagram of an example of an audit trail exposed for a distributed transaction ledger which stores records associated with a call recording.

FIG. 5 is a block diagram of an example of an audit trail exposed for a distributed transaction ledger 500 which stores records associated with a call recording. An original record associated with a call recording is stored within the distributed transaction ledger 500 when the call recording is generated. The original record includes data usable to reconstruct the call recording such as for later playback at an operator device (e.g., the operator device 420 shown in FIG. 4). In some cases, additional records associated with the call recording may also be stored with the distributed transaction ledger 500, such as by linking those additional records to the original record. Examples of additional records which may be stored include access-only records indicative of a read-only access of records associated with the call recording, such as for auditing purposes, and modification records indicative of a change to the data recorded to the initial record of the call recording.

Access-only records may be generated and written into the distributed transaction ledger 500 in response to an operator device accessing the original record, transmitting an authentication request to authenticate a record of the call recording within the distributed transaction ledger 500, or accessing the distributed transaction ledger 500 to perform an audit of recordings associated with the call recording. Modification records may be generated and written into the distributed transaction ledger 500 in response to a detected modification to a file of the call recording, such as where a copy of the call recording is created or changed. The modification may, for example, be detected based on a diffing operation performed against the new file and the original file from the original record for the call recording.

As shown, the distributed transaction ledger 500 includes a record 1 502, a record 2 504, and a record 3 506. The record 1 502 is an original record for the call recording and includes reconstruction data usable to reconstruct the original call recording file for later playback. The record 1 502 is generated and written into the distributed transaction ledger 500 in response to the generation of the call recording by a telephony system which facilitated the subject call. The record 2 504 is an access-only record generated and written into the distributed transaction ledger 500 in response to an operator device accessing the record 1 502 without copying or changing the call recording data. The record 3 506 is a modification record generated and written into the distributed transaction ledger 500 in response to an operator device accessing the record 1 502 and creating a copy of or otherwise changing the call recording data from the record 1 502.

This audit trail including the record 1 502, the record 2 504, and the record 3 506 is exposed to one or more devices which can access the distributed transaction ledger 500. This audit trail can be inspected or evaluated at various times throughout the life of the call recording (e.g., a period of time during which the recording must be maintained) to understand when, how, and by who changes occur to the call recording. For example, the audit trail may remain available during a compliance time period set based on the entity for which the records 502 through 506 are generated.

Figure 6:
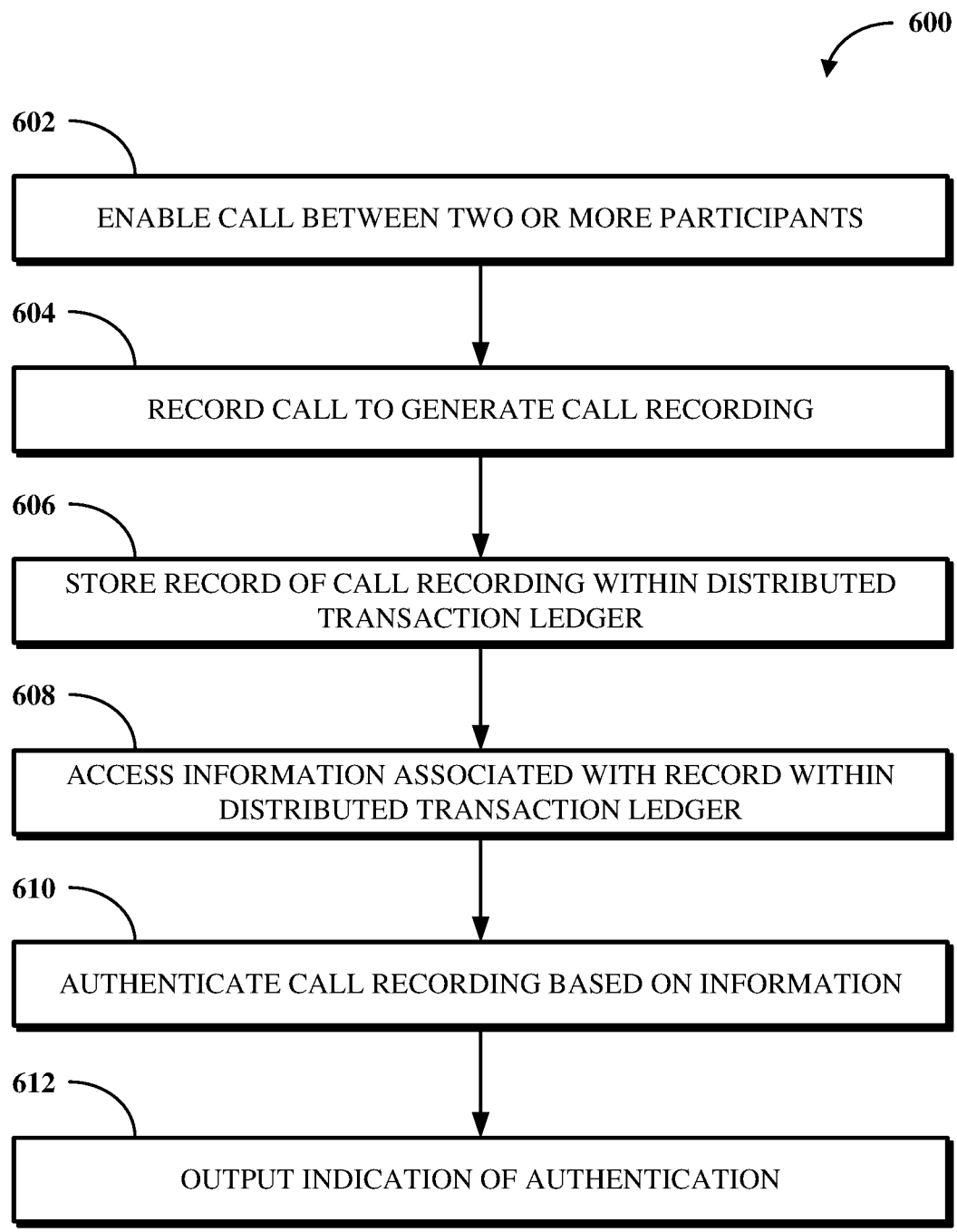
FIG. 6 is a flowchart of an example of a technique for call recording authentication using distributed transaction ledgers.
Figure 7:
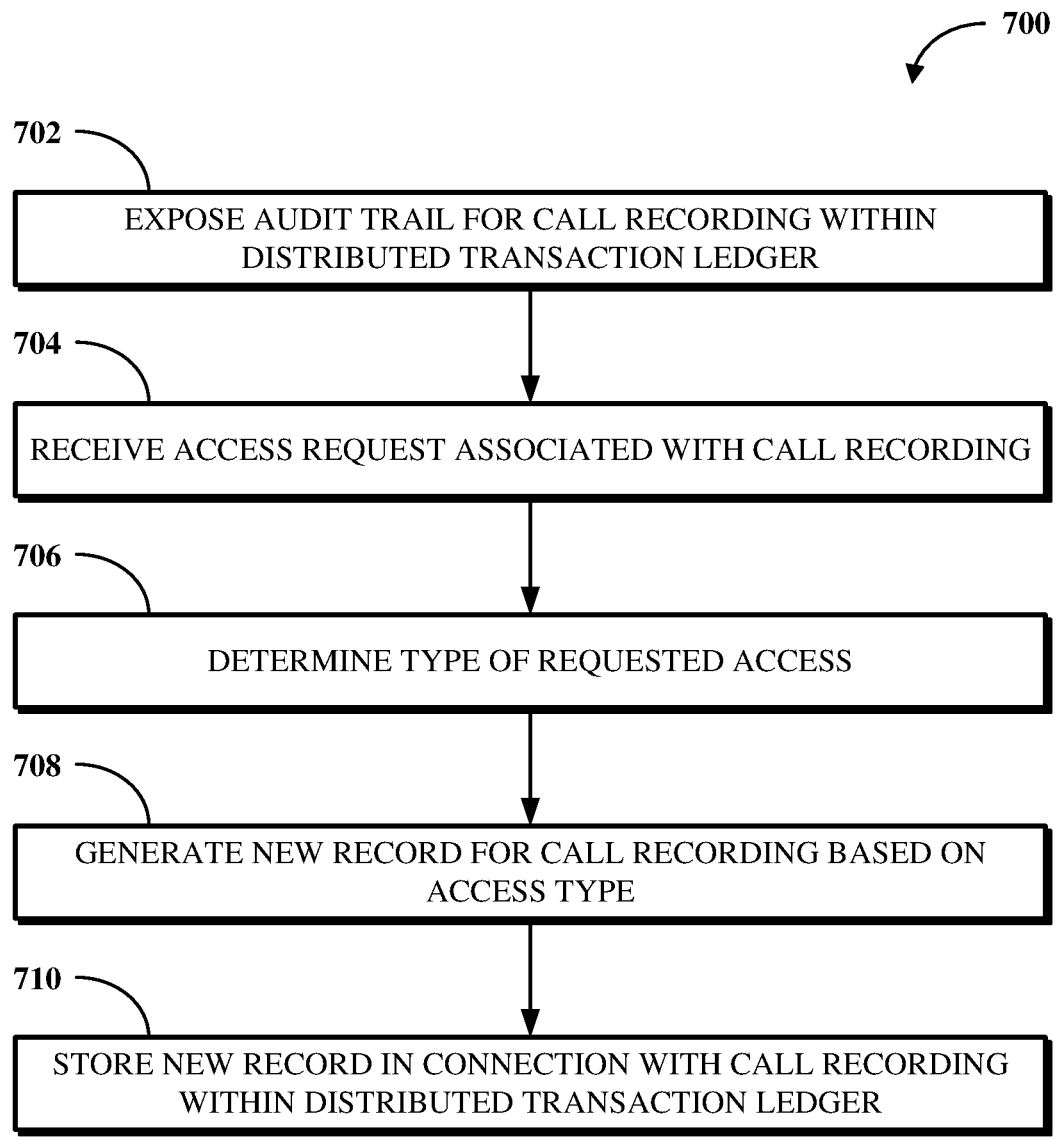
FIG. 7 is a flowchart of an example of a technique 700 for audit tracing of call recordings using distributed transaction ledgers.

To further describe some implementations in greater detail, reference is next made to examples of techniques which may be performed by or using a system for call recording authentication using distributed transaction ledgers. FIG. 6 is a flowchart of an example of a technique 600 for call recording authentication using distributed transaction ledgers. FIG. 7 is a flowchart of an example of a technique 700 for audit tracing of call recordings using distributed transaction ledgers.

The technique 600 and/or the technique 700 can be executed using computing devices, such as the systems, hardware, and software described with respect to FIGS. 1-5. The technique 600 and/or the technique 700 can be performed, for example, by executing a machine-readable program or other computer-executable instructions, such as routines, instructions, programs, or other code. The steps, or operations, of the technique 600 and/or the technique 700 or another technique, method, process, or algorithm described in connection with the implementations disclosed herein can be implemented directly in hardware, firmware, software executed by hardware, circuitry, or a combination thereof.

For simplicity of explanation, the technique 600 and the technique 700 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 6, the technique 600 for call recording authentication using distributed transaction ledgers is shown. At 602, a call is enabled between two or more participants. Enabling the call can include facilitating a direct or indirect telephony connection between the two or more participants in which at least two devices are connected to an intermediary telephony service. For example, the call may be enabled by a telephony system of a software platform which includes an authentication system for later authenticating a recording of that call. In another example, the call may be enabled by a telephony system which is external to a system which includes the authentication system.

At 604, the call is recorded to generate a call recording for the call. Recording the call to generate the call recording includes recording the call as it occurs or converting temporarily stored audio data of the call into a call recording. The call recording may in at least some cases be stored in a data store at the telephony system.

At 606, a record of the call recording is stored within a distributed transaction ledger. The distributed transaction ledger within which the record of the call recording is to be written may be identified based on information associated with the call. For example, the distributed transaction ledger may be identified based on an entity for which the call recording was generated, such as a software platform customer. In another example, the distributed transaction ledger may be identified based on an identifier of one or more of the call participants and/or of a subject topic of the call. In some cases where a single distributed transaction ledger remains open for new records to be written therein at a given time, such as where records are sequentially written without some grouping approach being used, that single distributed transaction ledger is identified. Once the distributed transaction ledger is identified, a new record is written therein to represent the call recording. A unique transaction identifier is written along with the record.

At 608, at a later time, information associated with the record stored within the distributed transaction ledger is accessed. The information associated with the record may be accessed based on an authentication request received from an operator device, which may be a device used by a participant to the subject call or another device. In one example, the operator device is a device used by an operator who is permitted to access the distributed transaction ledger, such as a person who works for the entity for which the call recording was generated. The authentication request is a request to authenticate the call recording as a true representation of the subject call. In some cases, the authentication request may be part of an audit tracing process, such as to verify an audit history of the call recording.

At 610, the call recording is authenticated based on the accessed information associated with the record. Authenticating the call recording based on the information associated with the record includes determining whether a latest record which includes data usable to reconstruct the call recording matches the transactional identifier generated for the original writing of the call recording data into the distributed transaction ledger. In particular, the information accessed may indicate a transactional identifier for the record, which the system can then compare against a known transaction identifier included in the record written into the distributed transaction ledger for the call recording. The call recording is authenticated using the distributed transaction ledger where the transactional identifier associated with the latest record which includes the data usable to reconstruct the call recording matches the known transaction identifier for the record written into the distributed transaction ledger for the call recording. Thus, the call recording may not be authenticated where a later record for the call recording exists within distributed transaction ledger, which may indicate that the call recording has been modified in some way.

At 612, an indication of the authentication is output, such as for further processing or display. For example, the indication of the authentication may be output to one or more client devices or other devices and over one or more modalities including without limitation telephony, conference, messaging, or the like.

Referring next to FIG. 7, the technique 700 for audit tracing of call recordings using distributed transaction ledgers is shown. At 702, an audit trail for a call recording is exposed within a distributed transaction ledger. The audit trail identifies records associated with the call recording within the distributed transaction ledger. The audit trail may further identify information associated with those records, such as a type of those records (e.g., initial, access-only, or modification). The exposure of the audit trail refers to the accessibility or other visibility of the records associated with the call recording by one or more operator devices.

At 704, an access request associated with the call recording is received. The access request is received from an operator device to which the audit trail for the call recording is exposed. The access request may, for example, be received from a client application or a web browser running at the operator device.

At 706, a type of the requested access is determined. The type of the requested access may be determined based on metadata associated with the access request, a form which receives the access request from the operator device, input received from the operator device indicating the type of access request, or the like. The type of the requested access indicates how to serve information from the distributed transaction ledger to the operator device as well as the type of next record which will be added into the distributed transaction ledger for the call recording.

At 708, a new record is generated for the call recording based on the access type. The new record indicates the determined type of the requested access to indicate the manner by which the pre-existing call recording record or records were interacted with. Generating the new record may include receiving data from the operator device which transmitted the access request to indicate whether any changes were made to the call recording as may have been retrieved from a pre-existing call recording record and what those changes were, as applicable. The new record is generated to include a unique transaction identifier.

At 710, a new record is stored within the distributed transaction ledger in connection with the call recording. Storing the new record includes modifying the audit trail for the call recording to include the new record, such as to indicate the access to the pre-existing call recording record or records to later auditors. The new record is distributed to copies of the distributed transaction ledger within a network to cause all versions of the distributed transaction ledger to represent the same set of records for the call recording.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    recording a call between two or more participants to generate a call recording;
    storing a record of the call recording within a distributed transaction ledger;
    storing, in the record of the call recording, a transaction identifier associated with the record of the call recording;
    storing a new record linked to the record responsive to an access request of the call recording, wherein a type of the access request indicates serving information from the distributed transaction ledger and a type of the new record, and wherein an audit trail for the call recording is modified to include the new record;
    authenticating the call recording based on a determination that a latest record for the call recording within the distributed transaction ledger includes the transaction identifier; and
    outputting an indication of the authentication.

2. The method of claim 1, wherein the distributed transaction ledger comprises information associated with the record, the information corresponding to one or more of an identifier of the record, an identifier of the distributed transaction ledger, an identifier of one or more of the two or more participants of the call, content of the call, a duration of the call, or a non-participant custodian of the distributed transaction ledger.

3. The method of claim 1, wherein a status of compute nodes which implement copies of the distributed transaction ledger is checked before a call recording stored within the distributed transaction ledger is accessed or modified.

4. The method of claim 1, wherein read-only records associated with the record of the call recording are stored in the distributed transaction ledger for auditing purposes.

5. The method of claim 1, comprising storing another new record linked to the record of the call recording in response to an audit of the recordings associated with the call recording.

6. The method of claim 1, comprising enabling the call between the two or more participants.

7. The method of claim 1, wherein the distributed transaction ledger is identified based on an entity for which the call recording was generated.

8. The method of claim 1, wherein the distributed transaction ledger is identified based on an identifier of one or more of the participants.

9. The method of claim 1, wherein the record of the call recording corresponds to a first portion of the call recording, the method comprising:
storing one or more other records of the call recording within the distributed transaction ledger, wherein each of the one or more other records corresponds to a portion of the call recording other than the first portion, and wherein the record and the one or more other records are linked within the distributed transaction ledger.

10. The method of claim 9, wherein authenticating the call recording comprises:
accessing information associated with the record within the distributed transaction ledger; and
authenticating the call recording as an accurate representation of the call between the two or more participants based on the information associated with the record and information associated with each of the one or more other records.

11. The method of claim 1, wherein the audit trail for the distributed transaction ledger exposing information associated with the call recording and accesses of the call recording is available to one or more users of a software platform.

12. The method of claim 11, wherein the audit trail remains available during a compliance time period.

13. The method of claim 11, wherein the software platform implements telephony services used to facilitate the call between the two or more participants.

14. A system, comprising:
a telephony system configured to enable a call between two or more participants; and
an authentication system configured to:
store a record of the call recording within a distributed transaction ledger;
store, in the record of the call recording, a transaction identifier associated with the record of the call recording;
authenticate the call recording based on a determination that a latest record for the call recording within the distributed transaction ledger includes the transaction identifier; and
store a new record linked to the record of the call recording responsive to an access request of the call recording, wherein a type of the access request indicates serving information from the distributed transaction ledger and a type of the new record, and wherein an audit trail for the call recording is modified to include the new record.

15. The system of claim 14, wherein the authentication system exposes the audit trail for the distributed transaction ledger.

16. The system of claim 15, wherein the audit trail remains available during a compliance time period.

17. An apparatus, comprising:
a memory; and
a processor configured to execute instructions stored in the memory to:
store a record of a call recording within a distributed transaction ledger
store, in the record of the call recording, a transaction identifier associated with the record of the call recording;
store a new record linked to the record of the call recording responsive to an access request of the call recording, wherein a type of the access request indicates serving information from the distributed transaction ledger and a type of the new record, and wherein an audit trail for the call recording is modified to include the new record;
authenticate the call recording based on a determination that a latest record for the call recording within the distributed transaction ledger includes the transaction identifier in response to a request from an operator device; and
output an indication of the authentication to the operator device.

18. The apparatus of claim 17, wherein the distributed transaction ledger comprises information associated with the record, the information including the transaction identifier generated for the record of the call recording.

* * * * *